(12) United States Patent
Clause

(10) Patent No.: US 9,823,686 B1
(45) Date of Patent: Nov. 21, 2017

(54) THREE-AXIS MOTION JOYSTICK

(71) Applicant: Clause Technology, Allentown, PA (US)

(72) Inventor: Brian Clause, Allentown, PA (US)

( * ) Notice: Subject to any disclaimer, the term of this patent is extended or adjusted under 35 U.S.C. 154(b) by 0 days.

(21) Appl. No.: 15/236,708

(22) Filed: Aug. 15, 2016

(51) Int. Cl.
| | | |
|---|---|---|
| *G05G 9/047* | (2006.01) | |
| *G05G 1/04* | (2006.01) | |
| *G05G 5/03* | (2008.04) | |
| *B62D 1/12* | (2006.01) | |
| *B60K 26/02* | (2006.01) | |

(52) U.S. Cl.
CPC ............. *G05G 9/047* (2013.01); *B60K 26/02* (2013.01); *B62D 1/12* (2013.01); *G05G 1/04* (2013.01); *G05G 5/03* (2013.01); *B60K 2026/029* (2013.01); *G05G 2009/04766* (2013.01); *G05G 2009/04774* (2013.01)

(58) Field of Classification Search
CPC .. B60K 26/00; B60K 2026/029; B60K 26/02; B62D 1/12; G05G 9/04; G05G 9/047; G05G 2009/04714; G05G 9/04737; G05G 2009/04781; G05G 9/04792; G05G 5/03; G05G 1/04; G05G 2009/04766; G05G 2009/04774; B25J 13/02; Y10T 74/20213
USPC ................ 180/333, 315; 74/471 R, 471 X Y
See application file for complete search history.

(56) References Cited

U.S. PATENT DOCUMENTS

| | | | | | |
|---|---|---|---|---|---|
| 3,011,739 A | * | 12/1961 | Boyce | ..................... | B64C 13/04 244/237 |
| 3,028,126 A | * | 4/1962 | Holleman | ............... | B64C 13/04 244/236 |
| 3,196,709 A | * | 7/1965 | Bickford | .................. | B62D 1/14 74/557 |
| 3,299,731 A | * | 1/1967 | Russell, Jr. | ............. | B64C 13/04 200/6 A |
| 3,312,123 A | * | 4/1967 | Rumpf | ..................... | B62D 1/04 280/775 |
| 3,350,956 A | * | 11/1967 | Monge | .................... | B64C 13/04 244/234 |
| 3,388,609 A | * | 6/1968 | Miller | .................... | G05G 9/047 137/636.2 |
| 3,831,633 A | * | 8/1974 | Corner | ................. | B62D 11/183 137/636.2 |

(Continued)

OTHER PUBLICATIONS

Bionic Laboratories, www.bioniklabs.com/ website, Inmotionwrist interactive therapy system, accessed on Jul. 7, 2016.

*Primary Examiner* — Paul N Dickson
*Assistant Examiner* — Timothy Wilhelm
(74) *Attorney, Agent, or Firm* — Michael J. Feigin, Esq.; Feigin & Fridman

(57) ABSTRACT

A controller having a joystick which can be moved in three dimensions is disclosed. The joystick is connected by a Y (yaw) link which is, in turn, connected to a P (pitch) link, which is, in turn connected to an R (roll) link. The R link is rotatable about a fixed-position mounting base. In this manner, one can rotate a joystick around any of three axes. When used to control a vehicle, rotation around the yaw and roll axes can steer (with yaw being more fine-tuned steering), and rotation around the pitch axis can control acceleration and deceleration. A starting or center position for each link can be defined, and the further a link is rotated and/or force increases on tires being steered from this central position, the more resistance is applied, in embodiments of the disclosed technology.

14 Claims, 18 Drawing Sheets

(56) References Cited

U.S. PATENT DOCUMENTS

| | | | | |
|---|---|---|---|---|
| 3,897,805 A * | 8/1975 | Casey | ................... | E02F 3/76 137/636.2 |
| 4,027,547 A * | 6/1977 | Rahman | ................ | G05G 9/047 137/636.2 |
| 4,069,720 A * | 1/1978 | Thor | ................... | B64C 13/04 244/225 |
| 4,422,345 A * | 12/1983 | Green | ................... | G05G 9/047 74/471 XY |
| 4,531,080 A | 7/1985 | Nordstrom et al. | | |
| 4,555,960 A | 12/1985 | King | | |
| 4,641,849 A * | 2/1987 | De Cortanze | ............ | B62D 1/12 180/219 |
| 4,667,909 A * | 5/1987 | Curci | ................... | B64C 13/12 244/234 |
| 4,726,248 A * | 2/1988 | Kawai | ................... | B25J 13/02 74/471 XY |
| 4,895,039 A * | 1/1990 | Hegg | ................... | B64C 13/04 180/333 |
| 4,920,820 A * | 5/1990 | Ingham | ................... | B62D 1/12 74/471 XY |
| 4,976,582 A * | 12/1990 | Clavel | ................... | B25J 9/1065 108/138 |
| 5,007,300 A * | 4/1991 | Siva | ................... | B25J 13/02 414/5 |
| 5,019,761 A * | 5/1991 | Kraft | ................... | G05B 19/427 318/568.1 |
| 5,050,449 A * | 9/1991 | Falcou | ................... | G05G 7/04 338/128 |
| 5,107,080 A * | 4/1992 | Rosen | ................... | B64C 13/04 200/6 A |
| 5,125,602 A | 6/1992 | Vauvelle | | |
| 5,142,931 A | 9/1992 | Menahem | | |
| 5,182,961 A * | 2/1993 | Menahem | ................ | B64C 13/04 244/234 |
| 5,379,663 A * | 1/1995 | Hara | ................... | B25J 13/02 345/161 |
| 5,456,428 A * | 10/1995 | Hegg | ................... | B64C 13/12 244/229 |
| 5,497,847 A * | 3/1996 | Ota | ................... | B60K 20/02 180/333 |
| 5,503,040 A * | 4/1996 | Wright | ................... | B64C 13/04 244/236 |
| 5,587,937 A * | 12/1996 | Massie | ................... | B25J 9/1689 700/264 |
| 5,655,411 A * | 8/1997 | Avitan | ................... | G05G 9/047 74/471 XY |
| 5,724,068 A * | 3/1998 | Sanchez | ................ | G05G 9/047 345/161 |
| 5,755,645 A * | 5/1998 | Miller | ................... | A61H 1/0285 482/115 |
| 5,769,363 A * | 6/1998 | Griswold | ................ | B64C 13/04 244/234 |
| 5,805,140 A * | 9/1998 | Rosenberg | ............ | G01B 5/008 345/156 |
| 5,859,372 A * | 1/1999 | Neltoft | ................... | G01L 5/166 250/221 |
| 5,979,264 A * | 11/1999 | Rosheim | ................ | B25J 17/0266 74/490.03 |
| 5,995,893 A * | 11/1999 | Lee | ................... | G05G 9/047 414/680 |
| 6,059,660 A * | 5/2000 | Takada | ................... | G05G 9/047 273/148 B |
| 6,222,179 B1 * | 4/2001 | Mikan | ................... | G05G 9/047 250/221 |
| 6,267,673 B1 * | 7/2001 | Miyamoto | ............ | A63F 13/06 463/23 |
| 6,293,160 B1 * | 9/2001 | Shigemoto | ............ | G01L 1/2231 73/862.632 |
| 6,437,771 B1 * | 8/2002 | Rosenberg | ............ | A63F 13/06 345/156 |
| 6,573,885 B1 * | 6/2003 | McVicar | ................ | F16D 3/382 345/156 |
| 6,642,685 B2 * | 11/2003 | Onodera | ................ | G05G 9/047 318/568.16 |
| 6,670,945 B1 | 12/2003 | Nakamura | | |
| 6,681,880 B2 * | 1/2004 | Bernhardt | ............ | G05G 9/047 172/442 |
| 6,722,224 B2 * | 4/2004 | Nordstrom | ............ | G05G 9/047 74/471 XY |
| 6,727,889 B2 | 4/2004 | Shaw | | |
| 6,805,021 B2 * | 10/2004 | Kato | ................... | F16H 59/105 74/473.12 |
| 6,837,124 B2 * | 1/2005 | Tsai | ................... | G05G 9/047 188/333 |
| 6,880,855 B2 * | 4/2005 | Chernoff | ................ | B60N 2/4693 180/315 |
| 6,966,397 B2 * | 11/2005 | Yanaka | ................... | B62D 1/12 180/315 |
| 7,236,157 B2 * | 6/2007 | Schena | ................... | A63F 13/06 345/161 |
| 7,320,263 B2 * | 1/2008 | Gustafsson | ............ | G05G 5/28 74/471 XY |
| 7,466,303 B2 * | 12/2008 | Yi | ................... | A61B 5/055 345/156 |
| 7,623,945 B2 * | 11/2009 | Kraft | ................... | B25J 13/02 414/2 |
| 7,675,258 B2 * | 3/2010 | Dattilo | ................... | G05G 1/04 318/560 |
| 7,701,161 B2 * | 4/2010 | Hanlon | ................... | B64C 13/04 318/561 |
| 7,726,692 B2 * | 6/2010 | Ozaki | ................... | B62D 1/04 280/778 |
| 7,783,384 B2 * | 8/2010 | Kraft | ................... | B25J 13/02 414/2 |
| 7,843,426 B2 * | 11/2010 | Larson | ................... | G05G 9/047 345/156 |
| 8,087,619 B2 * | 1/2012 | Hanlon | ................... | B64C 13/04 244/223 |
| 8,096,206 B2 * | 1/2012 | Konig | ................... | G05G 9/047 74/471 XY |
| 8,100,029 B2 * | 1/2012 | Peterson | ................ | G05G 9/047 244/234 |
| 8,230,755 B2 * | 7/2012 | Ishikawa | ................ | G05G 9/047 74/470 |
| 8,235,330 B2 * | 8/2012 | Rozovski | ................ | B64C 13/04 244/220 |
| 8,371,187 B2 * | 2/2013 | Payandeh | ................ | B25J 13/02 74/469 |
| 8,667,860 B2 * | 3/2014 | Helmer | ................... | B25J 13/02 74/490.01 |
| 8,770,055 B2 * | 7/2014 | Peterson | ................ | B64C 13/04 74/471 XY |
| 8,881,616 B2 * | 11/2014 | Dize | ................... | G05G 9/047 345/161 |
| 9,051,836 B2 * | 6/2015 | Yates | ................... | F01D 7/00 |
| 9,134,187 B1 * | 9/2015 | Organ | ................... | G01L 5/223 |
| 9,575,504 B2 * | 2/2017 | Dize | ................... | G05G 9/047 |
| 2002/0175467 A1 | 11/2002 | Dicus | ................... | B60G 17/033 273/148 B |
| 2002/0190948 A1 * | 12/2002 | Coutant | ................... | G05G 23/02 345/161 |
| 2003/0152452 A1 * | 8/2003 | Hodgson | ................ | B60N 2/4693 414/694 |
| 2004/0099081 A1 * | 5/2004 | Riwan | ................... | B25J 3/04 74/490.01 |
| 2006/0090588 A1 * | 5/2006 | Zumbusch | ............ | B62D 1/12 74/543 |
| 2006/0156848 A1 * | 7/2006 | Gosselin | ................ | B25J 13/02 74/471 XY |
| 2006/0254377 A1 * | 11/2006 | Henle | ................... | B64C 13/04 74/471 XY |
| 2008/0193260 A1 * | 8/2008 | Yokokohji | ............ | B25J 13/02 414/1 |
| 2009/0266948 A1 * | 10/2009 | Hanlon | ................... | G05G 9/047 248/201 |
| 2012/0017714 A1 * | 1/2012 | Rinaldi | ................... | G05G 9/047 74/471 R |

(56) References Cited

U.S. PATENT DOCUMENTS

| | | | |
|---|---|---|---|
| 2014/0160015 A1* | 6/2014 | Ogawa | B25J 13/02 345/156 |
| 2015/0060185 A1* | 3/2015 | Feguri | B60T 7/10 180/333 |
| 2017/0050721 A1* | 2/2017 | Voiles | G05G 9/047 |

* cited by examiner

THREE-AXIS MOTION JOYSTICK

FIELD OF THE DISCLOSED TECHNOLOGY

The disclosed technology relates generally to hand-held controllers and, more specifically, to joysticks which move around three wrist axes.

BACKGROUND OF THE DISCLOSED TECHNOLOGY

Conventional automobiles have three primarily hydromechanical actuators: hydraulic steering assist, hydraulic transmission, and hydraulic brakes. This hydraulic machinery is operated by arms moving a steering wheel and legs moving foot pedals. Arms, legs, steering wheel, and foot pedals all have significant inertia, and therefore relatively slow operating times. However, their slow operation is a good speed match for the slow response times of hydraulic steering, transmission, and brakes.

The typical electric vehicle (EV) has three primarily electromechanical actuators: electric power steering, electric motor propulsion, and electric regenerative braking (plus hydraulic brakes as backup). This electric machinery is also operated by arms moving a steering wheel and legs moving foot pedals. However, the slow operation of arms, legs, steering wheel, and foot pedals is a poor speed match for the fast response times of electric steering, propulsion, and braking.

Arms and legs moving a steering wheel and pedals are too cumbersome and slow to fully exploit the responsiveness of an EV's electric machinery. Automobile manufacturers have tried several alternatives, mainly the 2 degrees of freedom (DoF) tilt joystick. A 2 DoF tilt joystick is more nimble and faster to operate than a steering wheel and pedals, but it is not used in EVs because it is still not fast enough, and it has low steering precision.

A 2 DoF tilt joystick can be operated more nimbly than a steering wheel. However, like the steering wheel, it requires significant movement of the driver's entire arm. This is due to its pivot point being located below the driver's wrist. This pivot location simplifies the design and construction of the tilt joystick and makes it a very compact controller, but the required arm movement means it is not much faster than a steering wheel.

A typical steering wheel has a rotational range up to 900 degrees lock to lock—all the way left to all the way right. Using a steering wheel, a driver can turn an automobile through its entire range of steering and still make precise steering adjustments at any steering angle. A 2 DoF tilt joystick's maximum practical tilt range around its pivot point is about 90 degrees in any direction, or one tenth that of a steering wheel. This limited tilt range makes precise steering adjustments with a 2 DoF joystick very difficult to achieve over the entire range of steering. Because of its minimal speed advantage and low precision steering, the 2 DoF tilt joystick is not compelling enough to replace the mature technology of the steering wheel.

While some three degree of freedom joysticks do exist, there is a need in the art for devices which are simple to manufacture, reliable, and accurately transcribe motion in three directions.

SUMMARY OF THE DISCLOSED TECHNOLOGY

A controller of embodiments of the disclosed technology has a fixed position mounting base and a first flange having a first end and second end at right angles to each other, the first end of the first flange being rotatably connected to the fixed position mounting base. A second flange has a first end and second end at right angles to each other, the first end of the second flange rotatably connected to the second end of the first flange. A joystick (defined as an elongated flange which is gripped during usage by the controller) is rotatably connected to the second end of the second flange. A roll sensor (defined as a device which measures a degree, amount, or angle rotation of the joystick) measures rotation of the first flange with respect to the fixed position mounting base. A pitch sensor measures rotation of the second flange with respect to the first flange, and a yaw sensor measures rotation of the joystick with respect to the second flange. The pitch and yaw sensors are defined as identical to the roll sensor, except that they measure pitch and yaw, respectively, instead of roll.

In embodiments of the disclosed technology, a most elongated axis of the joystick is substantially perpendicular to a linkage which rotatably attaches the fixed position mounting base to the first flange. That is, the linkage is perpendicular to the joystick and is "in front" of the joystick when the joystick is centered in a resting position. As such, the second end of the first flange and the first end of the second flange are at right angles to each other as well, in such a configuration.

Rotation of the first flange with respect to the fixed position mounting base causes a vehicle to turn left or right. Rotation of the second flange with respect to the first flange causes the vehicle to accelerate or decelerate. Rotation of the joystick (e.g., yaw) with respect to the second flange causes the vehicle to turn left or right to a lesser degree (e.g., vehicle turning) per degree of rotation than said rotation of said first flange (e.g., roll) with respect to the fixed position mounting base.

A second version of the controller is like the first, except that the flanges are extended around on either side, forming a U-shaped connector. Thus, in this variation, a fixed position mounting base has a substantially U-shaped first flange having a mid-region and first and second ends, a middle of said mid-region rotatably connected to the fixed position mounting base. A substantially U-shaped second flange has a mid-region and first and second ends, the first ends of the first and second flanges being rotatably connected, and the second ends of the first and second flanges being rotatably connected. The joystick, in this embodiment, is rotatably connected to a middle of the mid-region of the second flange.

At least one torque motor engaged with a linkage between the first flange and the second flange provides counteractive force to movement of the second flange with respect to the first flange. The counteractive force, in embodiments of the disclosed technology, is zero when the second flange is at a right angle to the first flange and increases as said second flange moves away from the first/prior right angle to the first flange.

A most elongated axis of the joystick, in this second version/embodiment of the disclosed technology, is substantially perpendicular to each of: a) the mid-region of the first flange and second flange, b) the first ends of the first flange and second flange, and c) the second ends of the first flange and second flange. Further elements of the first version are equally applicable to the second version of this technology.

"Substantially" and "substantially shown," for purposes of this specification, are defined as "at least 90%," or as otherwise indicated. "Identical" and "exactly," for purposes of this specification, are defined as "within an acceptable tolerance level known in the art." Any device may "comprise," or "consist of," the devices mentioned here-in, as limited by the claims. Any element described may be one of "exactly" or "substantially," as described.

It should be understood that the use of "and/or" is defined inclusively, such that the term "a and/or b" should be read to include the sets: "a and b," "a or b," "a," or "b."

DETAILED DESCRIPTION OF EMBODIMENTS OF THE DISCLOSED TECHNOLOGY

A controller having a joystick which can be moved in three dimensions is disclosed. The joystick is connected by a Y link (sometimes referred to as a "flange") (yaw) which is, in turn, connected to a P link (pitch), which is, in turn connected to an R link (roll). The R link is rotatable about a fixed-position mounting base. In this manner, one can rotate a joystick in any of three directions. When used to control a vehicle, rotation around the yaw and roll axes can steer (with yaw being more fine-tuned steering), and rotation around the pitch axis can control acceleration and deceleration. A starting or center position for each link can be defined, and the further a link is rotated from this central position, the more resistance is applied, in embodiments of the disclosed technology.

Embodiments of the disclosed technology will become clearer in view of the forthcoming description of the figures.

Figure 1:
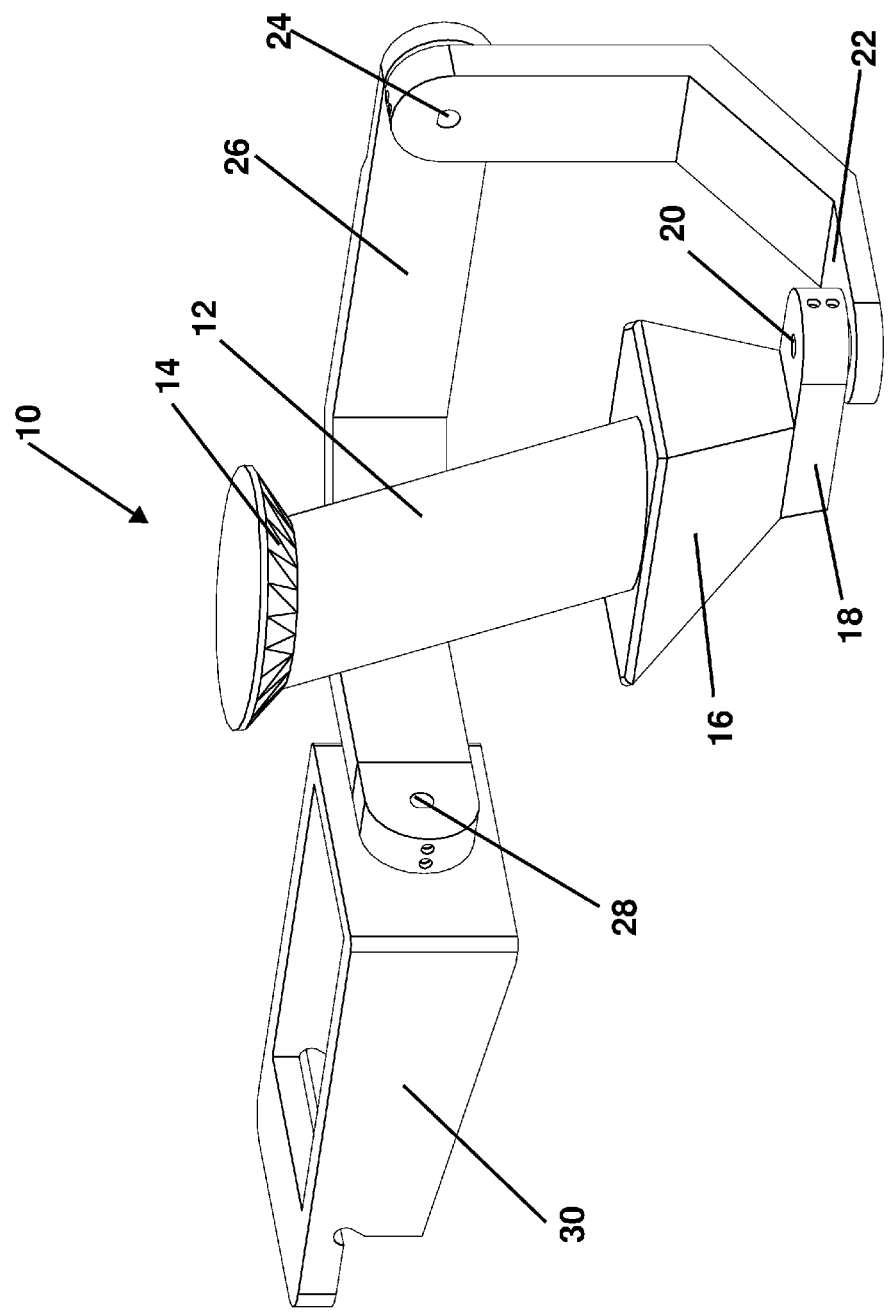
FIG. 1 shows a first controller with three axes of movement in a first resting position, in an embodiment of the disclosed technology.

FIG. 1 shows a first controller with three axes of movement in a first resting position, in an embodiment of the disclosed technology. Here, a mounting base 30 is fixedly mounted, such as to an interior of a car, a table top, or the like. It can be mounted within a dashboard of a vehicle or fixed to a top surface either temporarily or permanently. For example, when the controller is used for video games, one might clamp the mounting base 30 to a top of a table surface, whereas when used in an electric vehicle, it might be within a dashboard and fixedly connected, such that it stays stationary with respect to a car chassis. Using a linkage 28, a first flange 26 rotates around the linkage and, as such, the first flange 26 is rotatably connected to the mounting base 30. The linkages described herein rotatably connect two elements together such that many rotations back and forth can take place while the rotatable connection between the two elements linked, remain rotably connected. The linkages allow for 360 degrees of rotation around a single axis.

A second flange 22 connects to the first flange 26 by way of a second linkage 24. The first and second flanges rotate at right angles to one another. Each has a turn of ninety degrees between a first connecting end and a second connecting end, a "connecting end" being a portion there-of through which a linkage passes there-through. In some embodiments, there are three sections of each flange, as shown in FIG. 1 where a first end portion with linkage passing there-through/portal for a linkage is at a 45 degree angle to a mid-region of the flange, which is, in turn, at a 45 degree angle to a second end portion. Thus, an "end" of a flange is a portion which connects to another item and is defined by a furthest end of the flange until a bend in the flange, the bend occurring after a portal/linkage passing there-through, such that the linkage is between the furthest end and bend.

Still referring to FIG. 1, a joystick 12 is rotatably connected to a second end of the second flange 22. The joystick can have a wider base 16, a wider top region 14, and a linking section 18. The linking section has, in some embodiments, a portal through which a linkage 20 passes therethrough to connect the joystick and base 12/16 to the second end of the second flange 22. The joystick can rotate about the linkage 20. As such, the elongated length of the joystick 12 (the most elongated length or length desired to be perpendicular to a forearm of a person holding the joystick/passes through a clasped hand there-around) is perpendicular to the linkage 28 between the mounting base 30 and first flange 26, as well as perpendicular to the linkage 24 connecting the first 26 and second 22 flanges together.

Note that linkages 28, 24, and 20 are, in at least one configuration, perpendicular to one another. The joystick 12 is in front of the mounting piece 30 when every flange is centered, meaning that, in embodiments, one reaches to hold the joystick such that the joystick 12 is situated between the person holding the joystick and mounting base 30. Then, the joystick 12 is in a position to be moved around any of three axes, causing the corresponding flange joystick to rotate with respect to one to which it is rotatably connected. This will be shown/discussed with reference to FIGS. 3-9 below.

Figure 2:
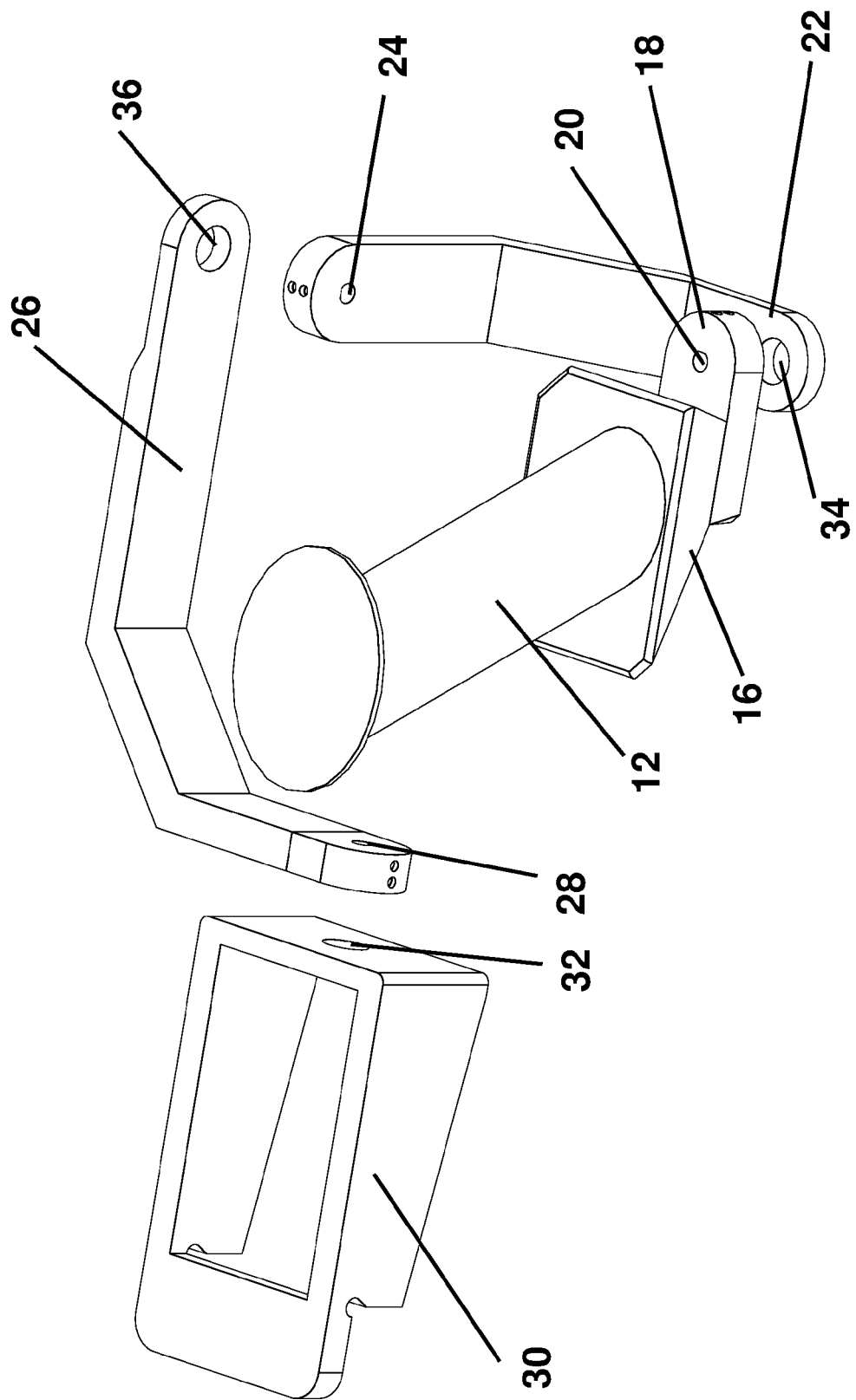
FIG. 2 shows a blown-apart version of the controller of FIG. 1.

FIG. 2 shows a blown apart version of the controller of FIG. 1. Here, one can see the mounting base 30 with a portal 32 passing there-through for a linkage 28. The linkage can be any sort of elongated fastening mechanism such as a dowel, screw, or motor axle. Note that, in this embodiment, the first flange 26 is defined by three sections. A first end has the linkage 28 pass there-through, and a second end has a portal 36 with a linkage 24 pass there-through. A middle section is between the first and second ends, and the first end, middle section, and second end are distinct from one another based on the position of the bend between each and a generally flat, elongated region within each. This same configuration applies to the second flange 22, except that the first end has a linkage 24, and a second end has a portal 34.

The first flange 26 is also referred to herein as an "R link", the second flange 22 as a "P link," and the linking section 18 as a "Y link." Each link can rotate with respect to each link to which it is connected. In embodiments, each link can only rotate with respect to a link to which it is connected. Thus, the R link 26 can rotate with respect to the mounting base 30 in a manner which constitutes "roll." The P link 22 can rotate with respect to the R link in a manner which constitutes "pitch," and the Y link 18 can rotate with respect to the R link in a manner which constitutes "yaw." Any combinations of changes of roll, pitch, and yaw are possible, though typically limited by the rotation of the forearm and/or wrist of the user of the controller.

Figure 3:
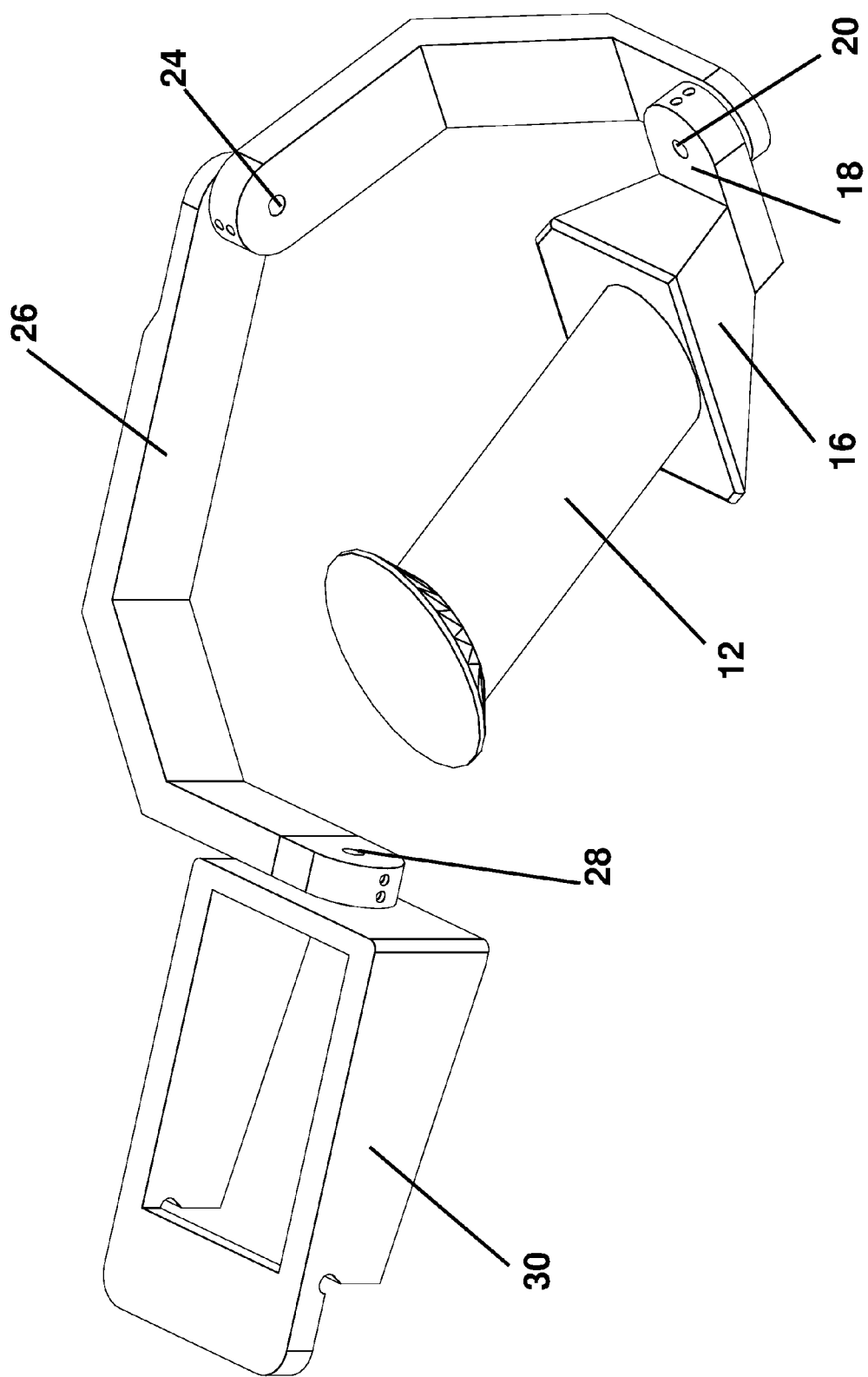
FIG. 3 shows the controller of FIG. 1 rotated around the pitch axis.

FIG. 3 shows the controller of FIG. 1 with rotations around the pitch axis. Here, the P link is pulled back, where "front" is defined as towards or at the mounting base 30, and "back" is away there-from. The rotation of the P-link with respect to the R-link causes a change in pitch which can be recorded by a sensor, such as measuring rotation within/at the inner edges of the portal 36 (see FIG. 2).

Figure 4:
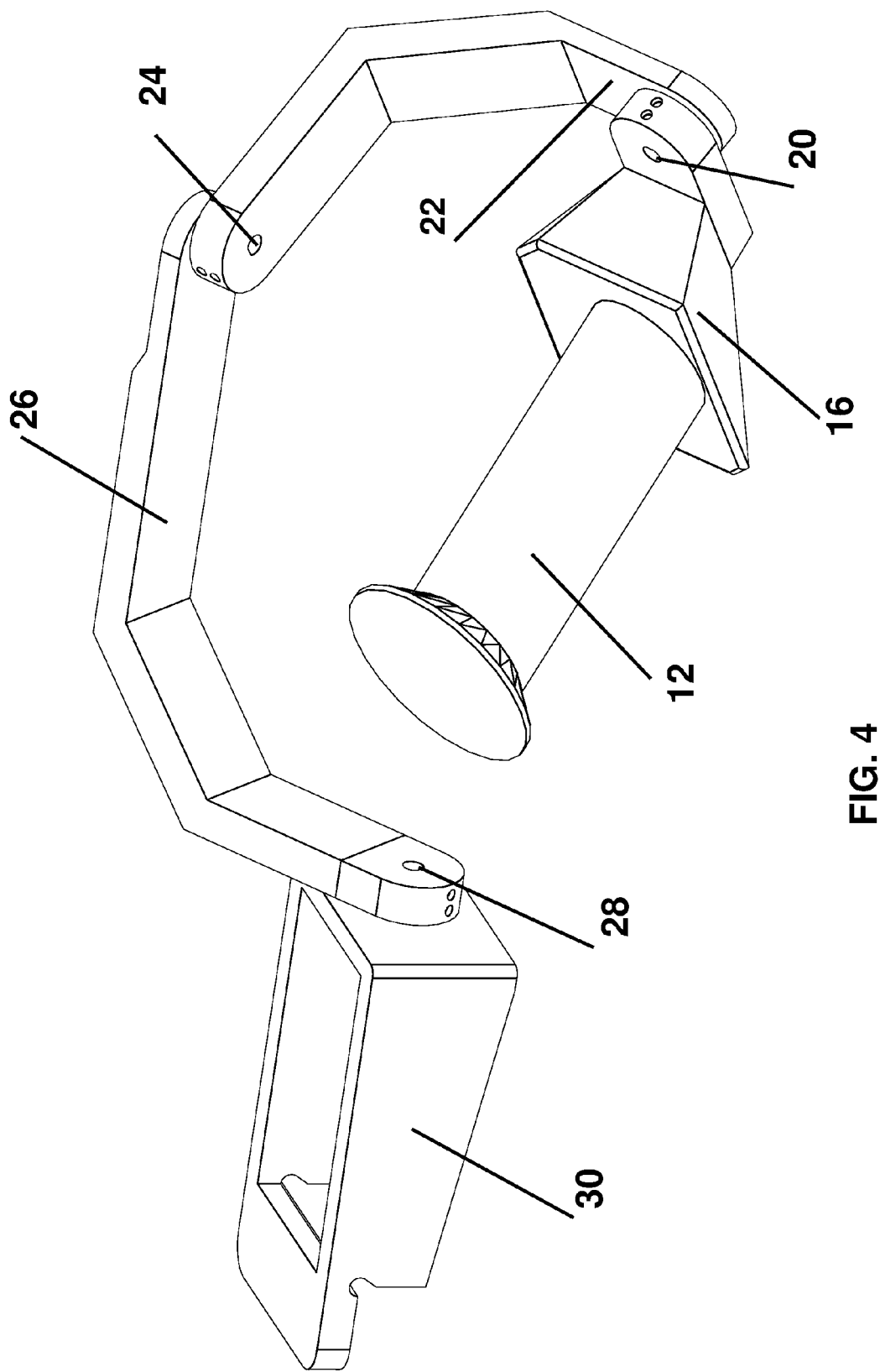
FIG. 4 shows the controller of FIG. 1 rotated around the pitch and roll axes.

FIG. 4 shows the controller of FIG. 1 with rotations around the pitch and roll axes. In addition to the rotation described with reference to FIG. 3 around the pitch axis, rotation of the first flange 26 (R-link) with respect to the mounting base 30 takes place around the linkage 28. This rotation can also be measured with sensors, such as within the mounting base 30 measuring rotational displacement of the linkage 28. Such sensors can be hidden with the mounting base and/or flange and cannot necessarily be seen from the outside, such as in FIG. 4.

Figure 5:
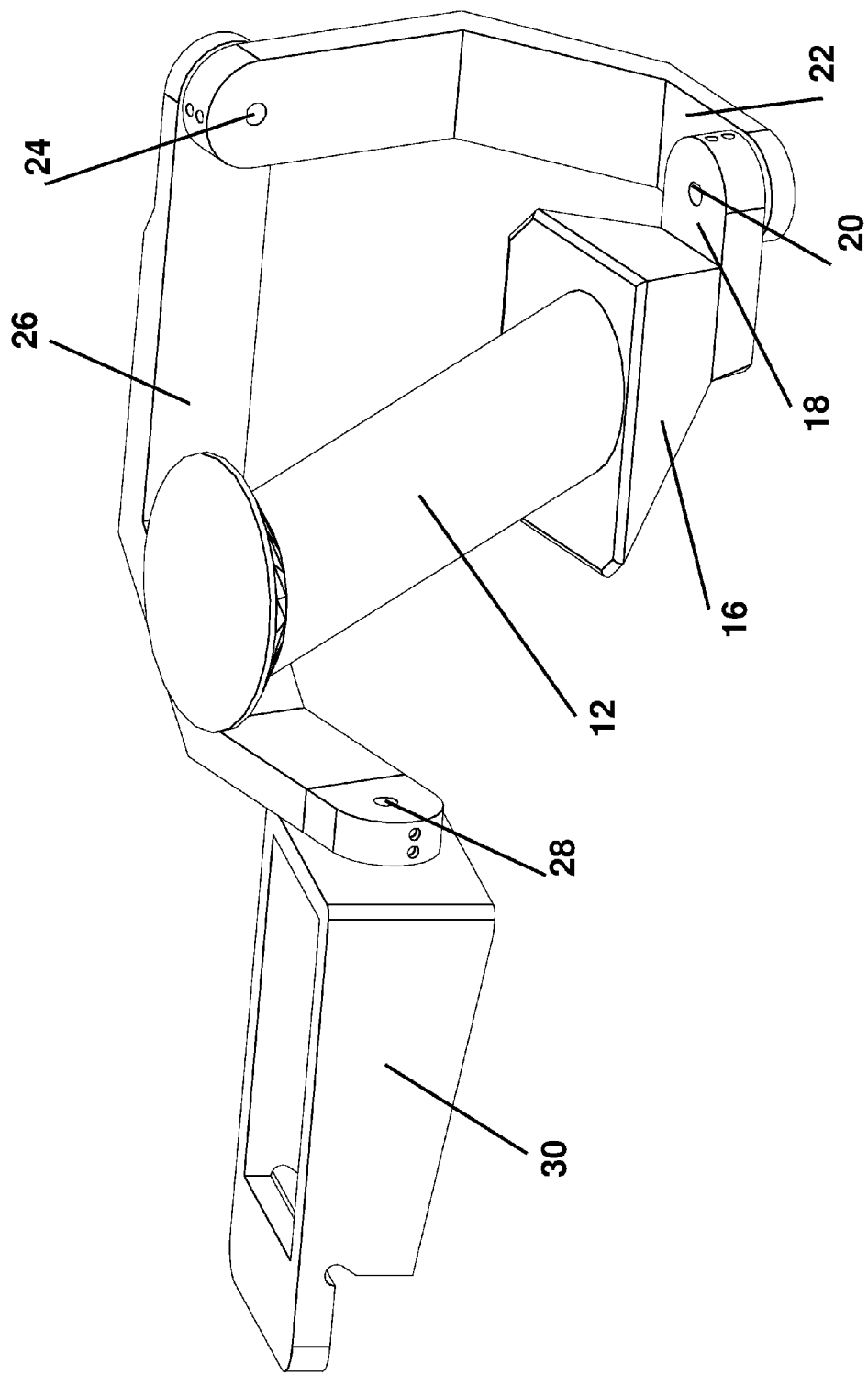
FIG. 5 shows the controller of FIG. 1 rotated around the roll axis.

FIG. 5 shows the controller of FIG. 1 with rotation around the roll axis. To accomplish this, only the first flange 26 is rotated, while the position of the second flange 22 with respect to the first flange stays the same.

Figure 6:
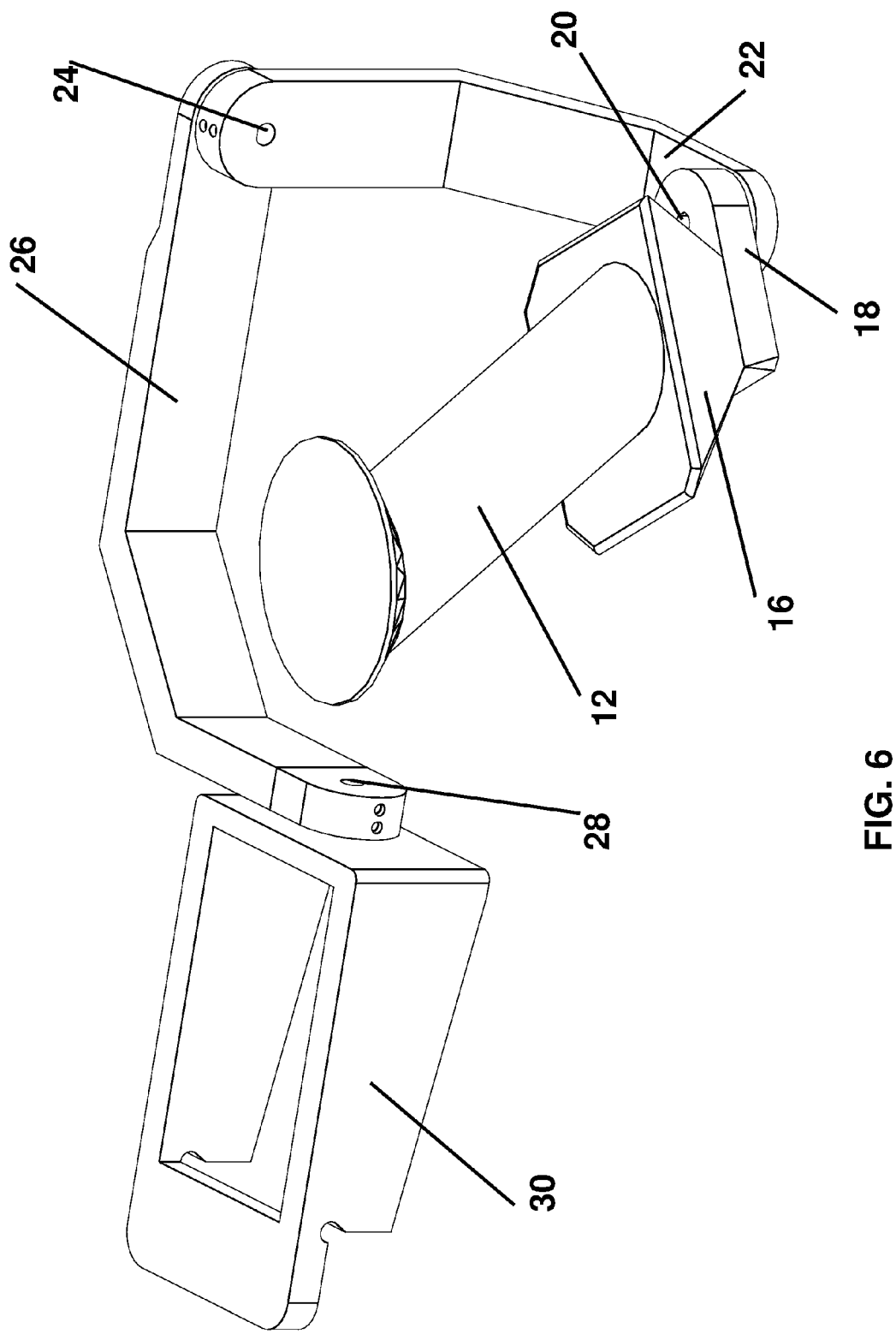
FIG. 6 shows the controller of FIG. 1 rotated around the yaw axis.

FIG. 6 shows the controller of FIG. 1 with a rotation around the yaw axis. This rotation is accomplished by rotating the joystick 12 with respect to the second flange 22. Measurement of this angle of change (yaw) can be made within, or at, the linkage 20.

Figure 7:
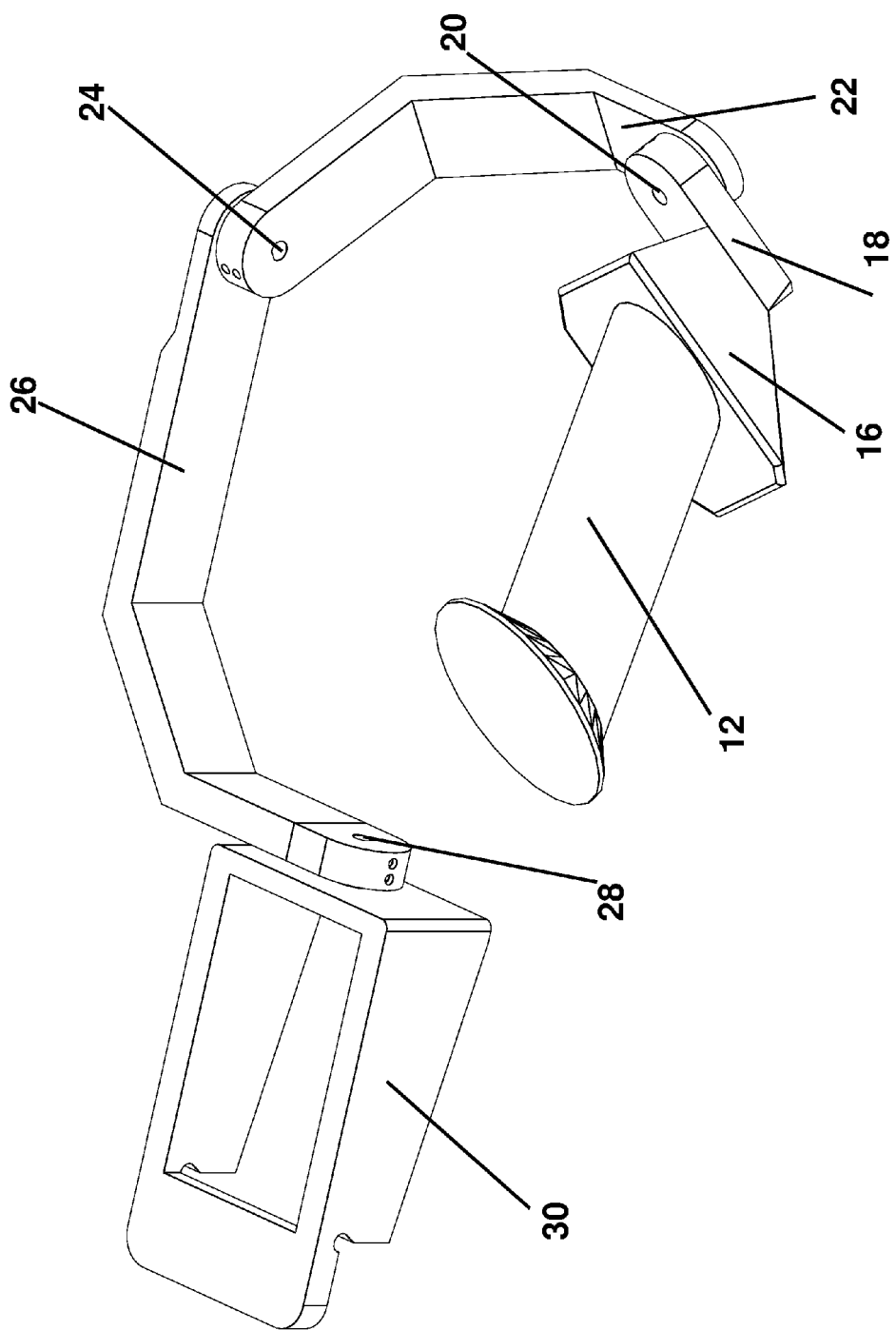
FIG. 7 shows the controller of FIG. 1 rotated around the yaw and pitch axes.

FIG. 7 shows the controller of FIG. 1 with rotations around the yaw and pitch axes. Here, the combination of rotating the joystick 12 with respect to the second flange 22, and rotation of the second flange 22 with respect the first flange 26 (rotation of the Y link and P link), causes a change in yaw and pitch simultaneously.

Figure 8:
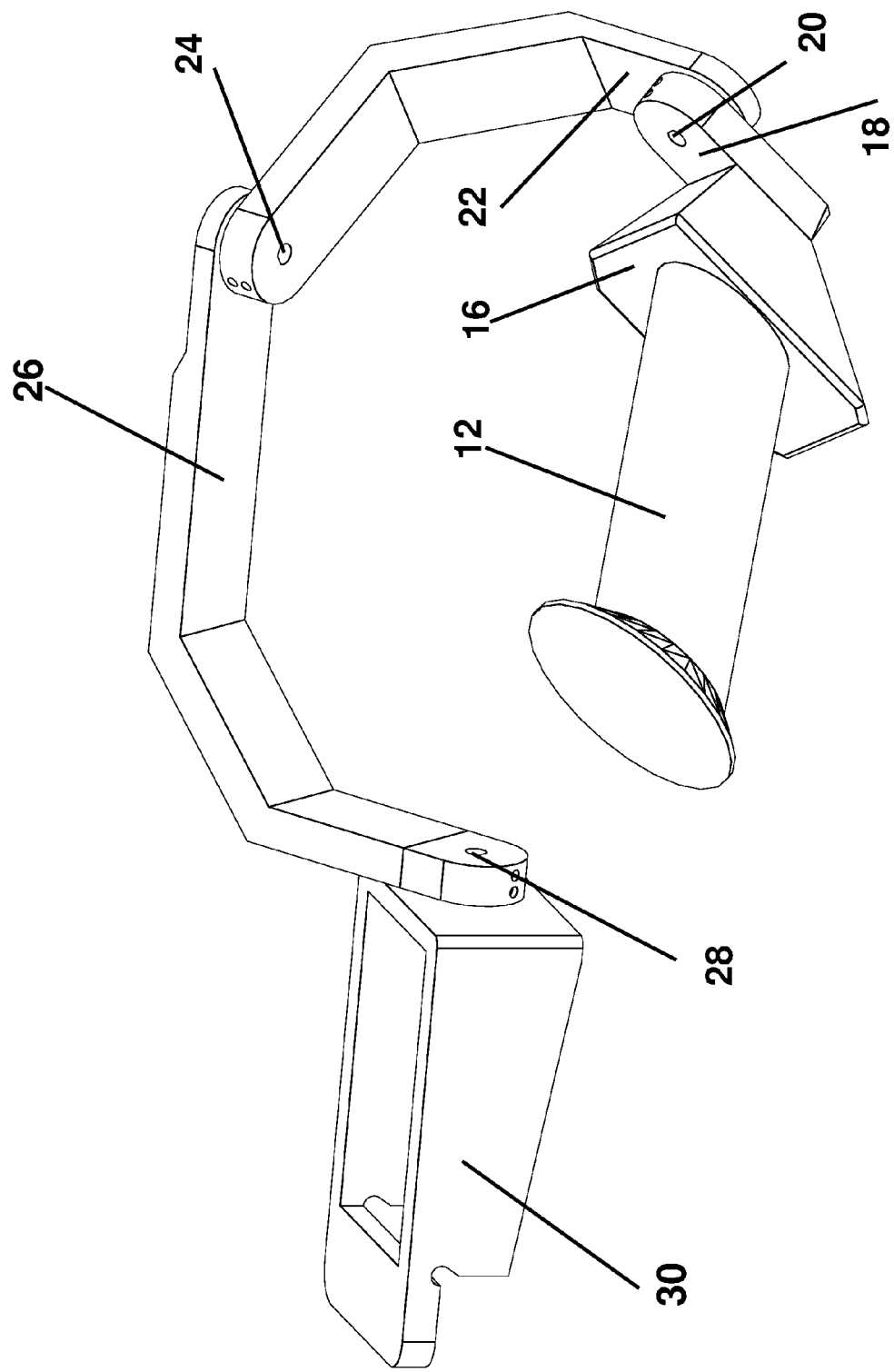
FIG. 8 shows the controller of FIG. 1 rotated around the yaw, pitch, and roll axes.

FIG. 8 shows the controller of FIG. 1 with rotations around the yaw, pitch, and roll axes. Here, each element which can be rotated with respect to another, in an embodiment of the disclosed technology, is so rotated. Rotation of the R link (flange 26 with respect to the mounting base 30) can be used to steer a vehicle left or right. Rotation of the P link (flange 22 with respect to flange 26) can be used for acceleration and deceleration of a vehicle. Rotation of the Y link (flange 18 with respect to flange 22) can be used for fine control of steering, such that, per degree of rotation, steering has less magnitude for rotation of the Y link compared to rotation of the R link.

Figure 9:
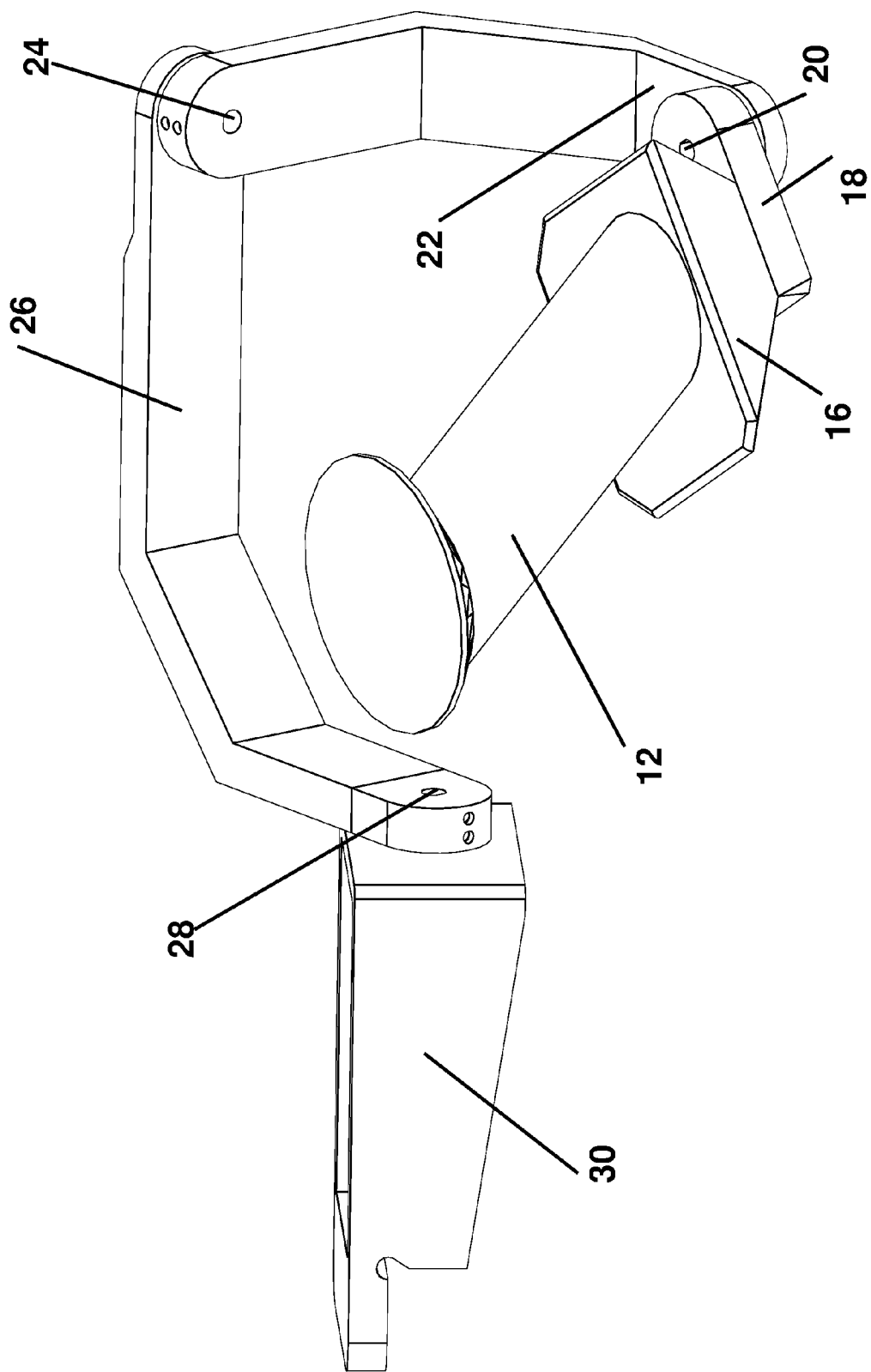
FIG. 9 shows the controller of FIG. 1 rotated around the yaw and roll axes.

FIG. 9 shows the controller of FIG. 1 with rotations around the yaw and roll axes. Here, the pitch remains constant, compared to FIG. 1 (flange 22 with respect to flange 26 remain at a 90 degree angle to each other), but the yaw is changed (the joystick 12 angle to the second flange 22 changes,) as well as the roll (the angle of the first flange 26 with respect to the mounting base 30).

Figure 10:
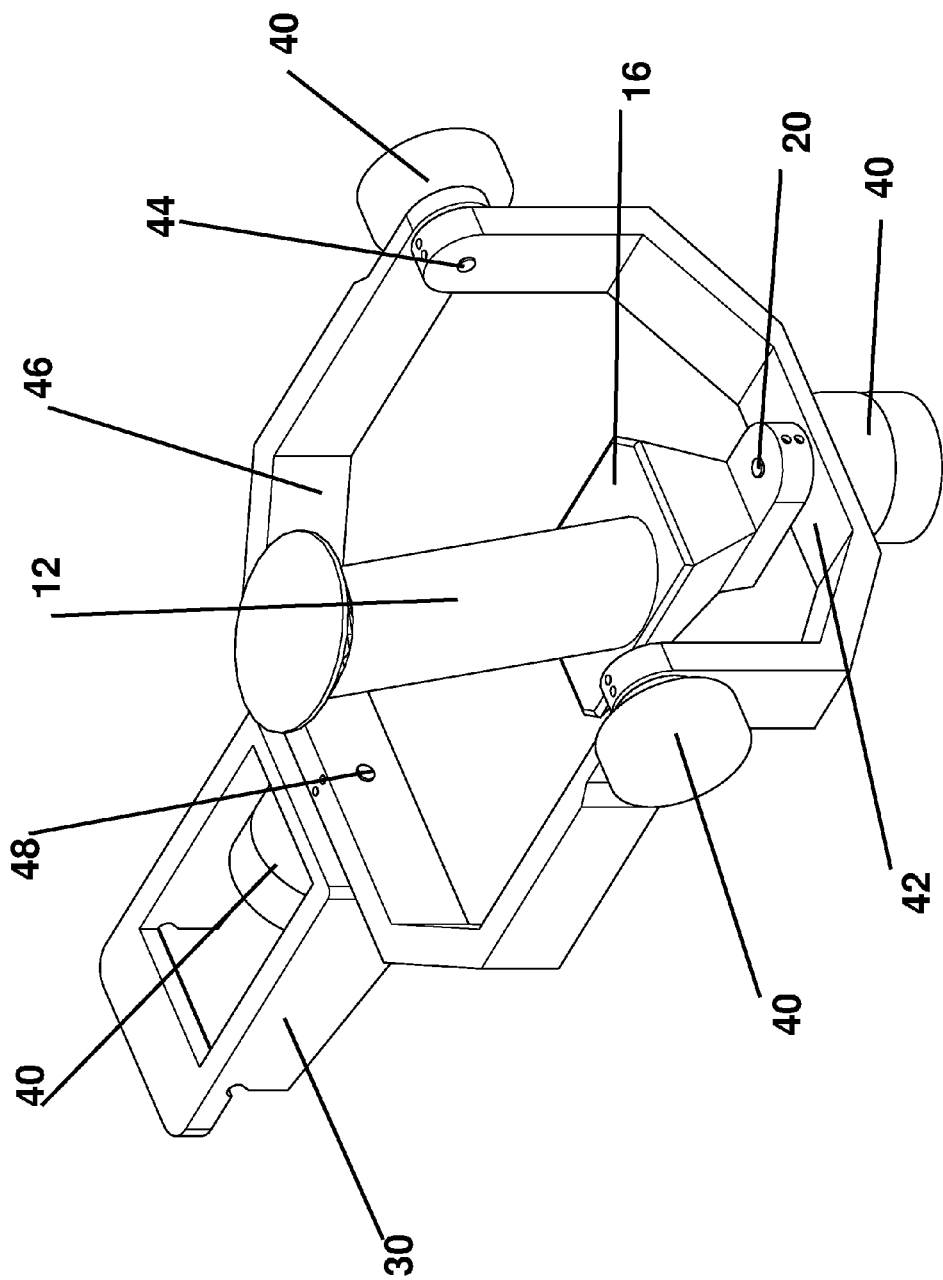
FIG. 10 shows a second controller with three axes of movement in a first resting position, in an embodiment of the disclosed technology.

FIG. 10 shows a second controller with three axes of movement in a first resting position, in an embodiment of the disclosed technology. Elements of FIGS. 10-18, which remain the same as those of FIGS. 1-9 above, are identically numbered, where possible. Here, there is a plurality of servos or motors 40 which introduce counter-force or torque when the first linkage 46, second linkage 42, or joystick 12 are rotated with respect to another element. In some embodiments, the greater the offset from a right angle, or 90 degrees, to an adjacent element, the greater the torque/resistive force. This prevents excess movement and can simulate torque one would feel when, for example, moving steering wheels left and right. Thus, for example, rotation of the first flange 46 with respect to the mounting base 30 can cause wheels of a vehicle to rotate. The more the wheels rotate, in a mechanical setting, the more resistance is felt on a steering wheel or device. A first motor 40 situated in the mounting base 30 adds counter force, pushing the first flange back to a central position to which the flange 46 will return if a person stops applying force there-on.

Figure 11:
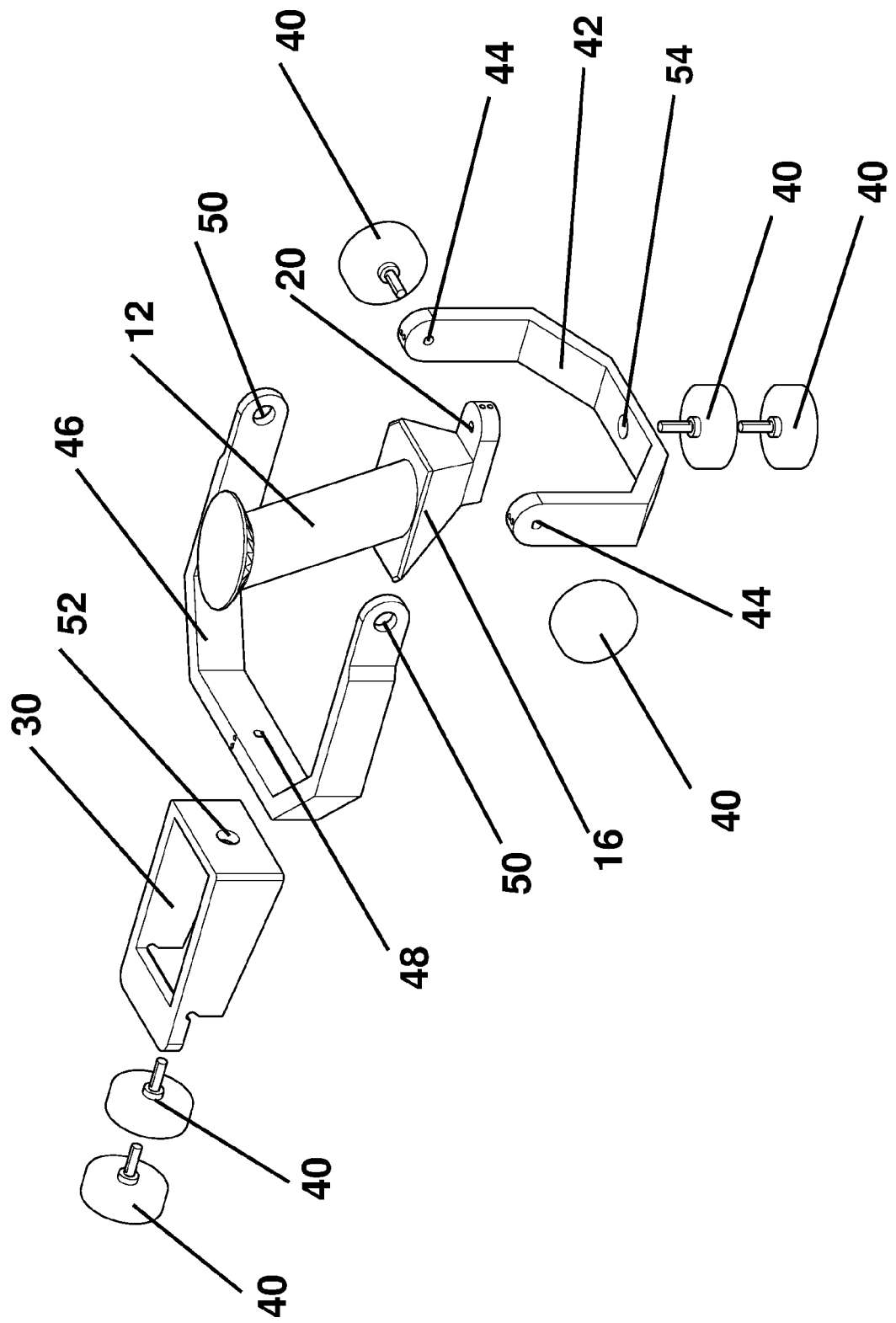
FIG. 11 shows a blown-apart version of the controller of FIG. 10.

FIG. 11 shows a blown-apart version of the controller of FIG. 10. Note that the elements 40 can be used to measure turning angle of the elongated member there-in, and thus, the angle of turn of two elements with respect to one another. The elements 40 can also comprise motors or other devices which generate torque as the elongated elements are turned with respect to other elements. These other elements include a mounting base 30 having a portal 52 through which a linkage 48 passes, and a first flange 46, which is generally U-shaped and has portals 50. A second flange 42 is also generally U-shaped and has portals 44 attached to the portals 50, such that the second flange is rotatable with respect to the first, which is, in turn, rotatable with respect to the mounting base 30. The first flange 46 and second flange 42 are analogous to the respective same-named flanges 26 and 22, but, instead of having a 90 degree turn from a first end to a second end, have a 180 degree turn from a first end to a second end. They are connected to other elements at each end, as well as at the center of each middle region. Another way of describing this is that a substantially mirror image of each first flange 26 and 22 is attached, forming a U-shape with the same connection locations, except that an end (at linkage 48 and portal 54) is now in a middle region, and a second end of each flange also connects to an adjacent flange. Thus, there are now two connection points 50 and two connection points 44.

Figure 12:
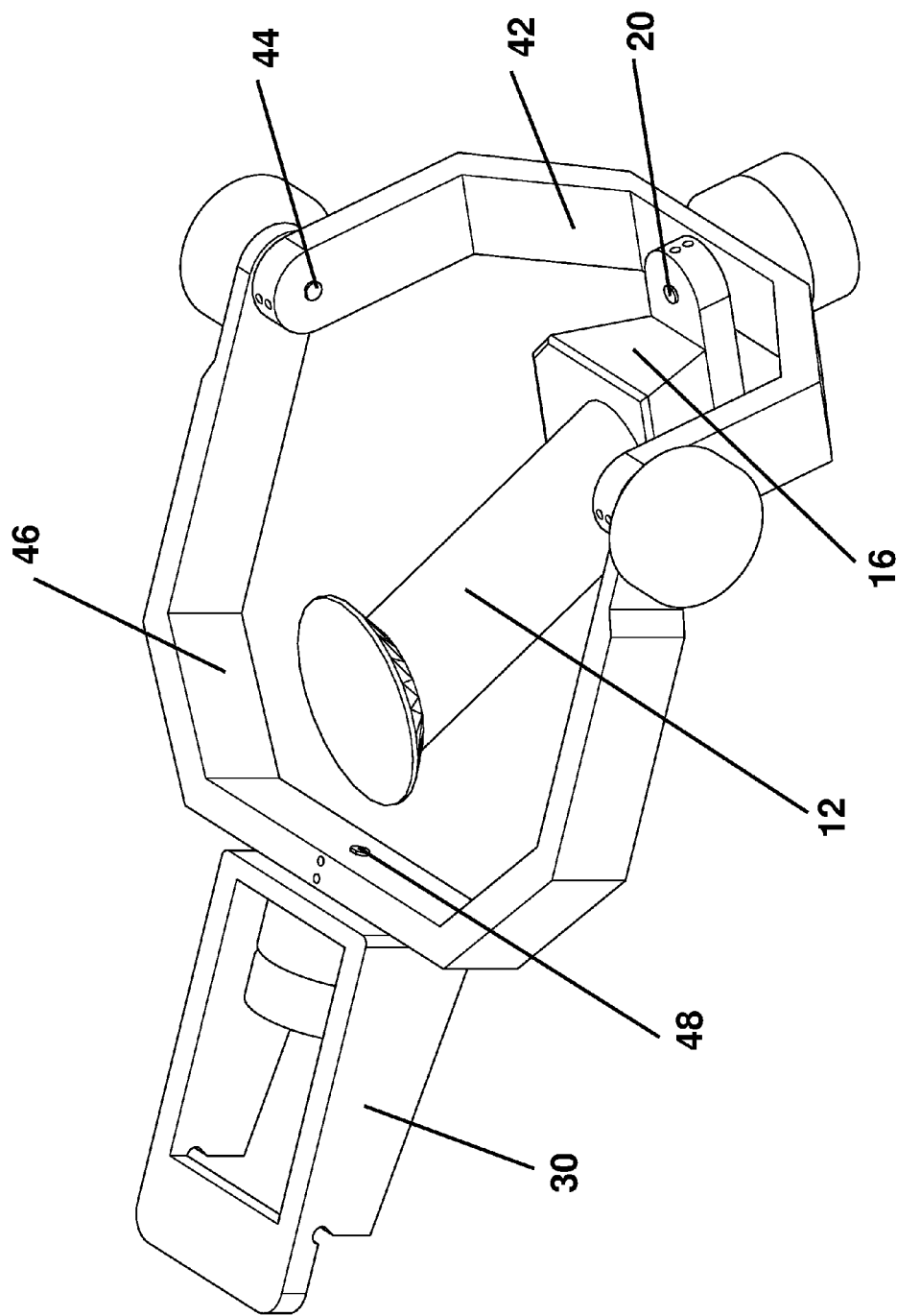
FIG. 12 shows the controller of FIG. 10 rotated around the pitch axis.

FIG. 12 shows the controller of FIG. 10 with rotation around the pitch axis. This is analogous to what is shown in FIG. 3 in the prior version thereof. All elements of FIG. 3 remain the same, except that the first and second flanges extend on both sides, forming a U-shape, and connect twice into each other instead of once into each other. Note that the first flange 46 is in the same rotational position as the starting position shown in FIG. 10, but the second flange 44 is rotated with respect to the first flange.

Figure 13:
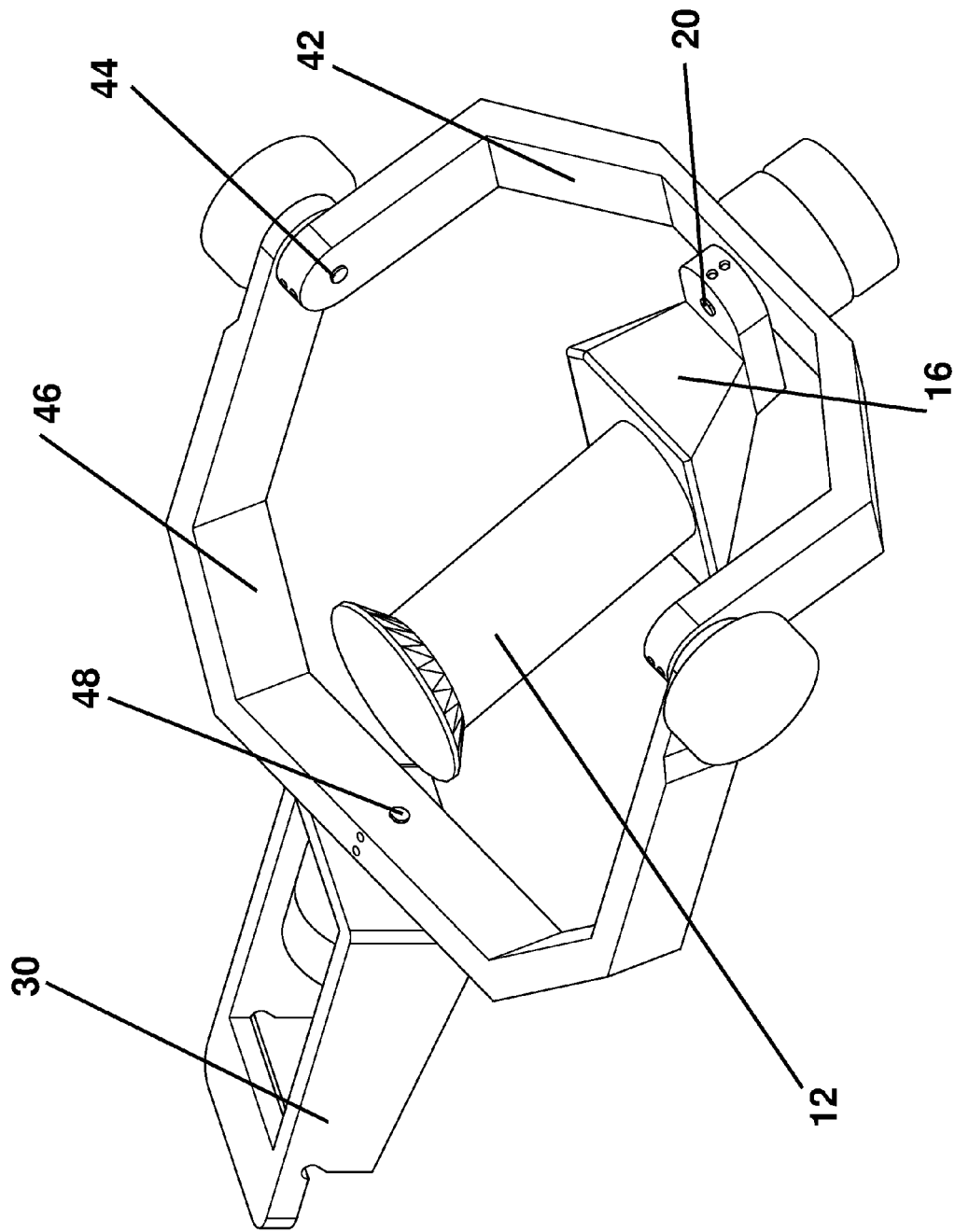
FIG. 13 shows the controller of FIG. 10 rotated around the pitch and roll axes.

FIG. 13 shows the controller of FIG. 10 with rotations around the pitch and roll axes. This is analogous to what is shown in FIG. 4.

Figure 14:
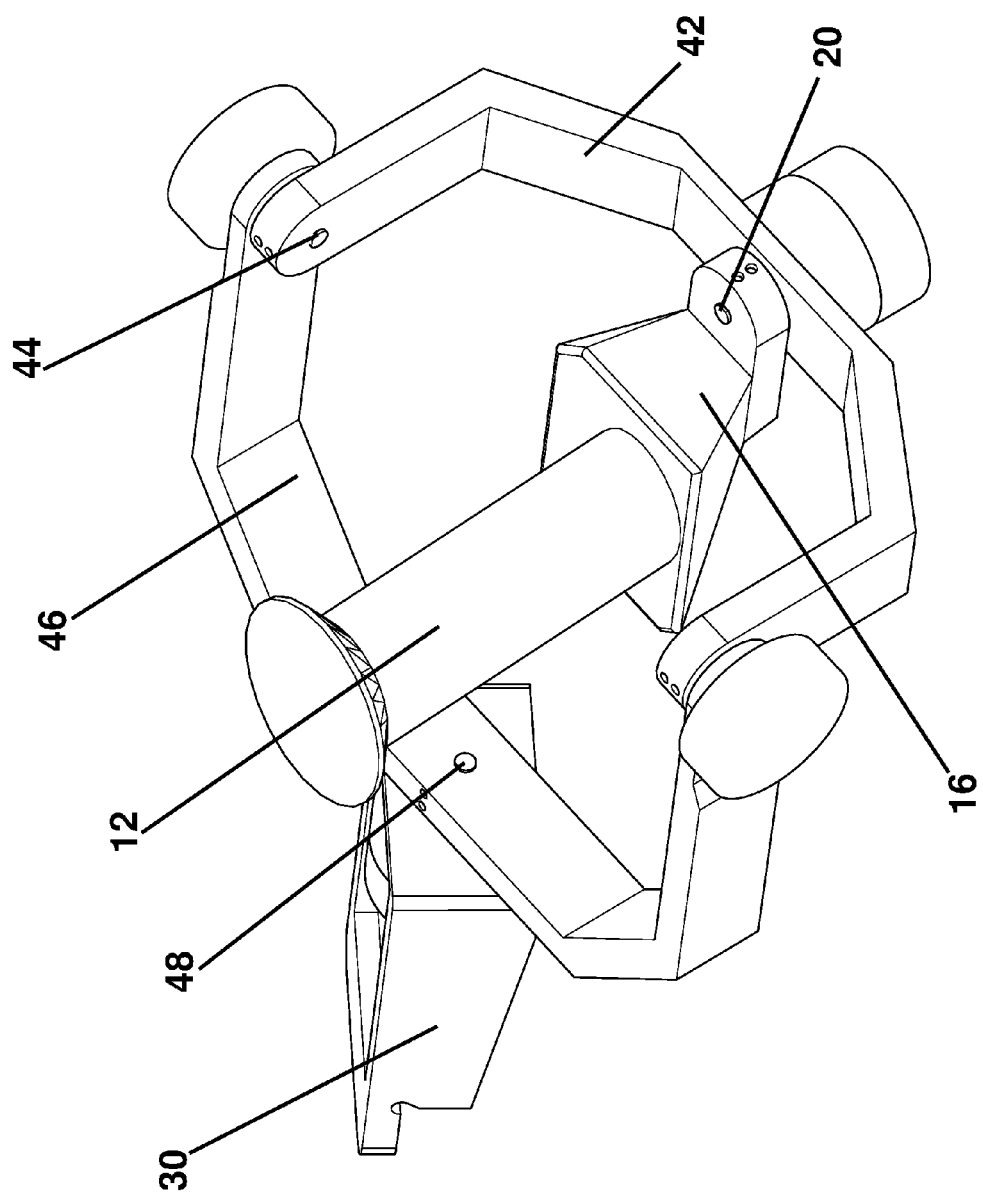
FIG. 14 shows the controller of FIG. 10 rotated around the roll axis.

FIG. 14 shows the controller of FIG. 10 with rotation around the roll axis. This is analogous to what is shown in FIG. 5.

Figure 15:
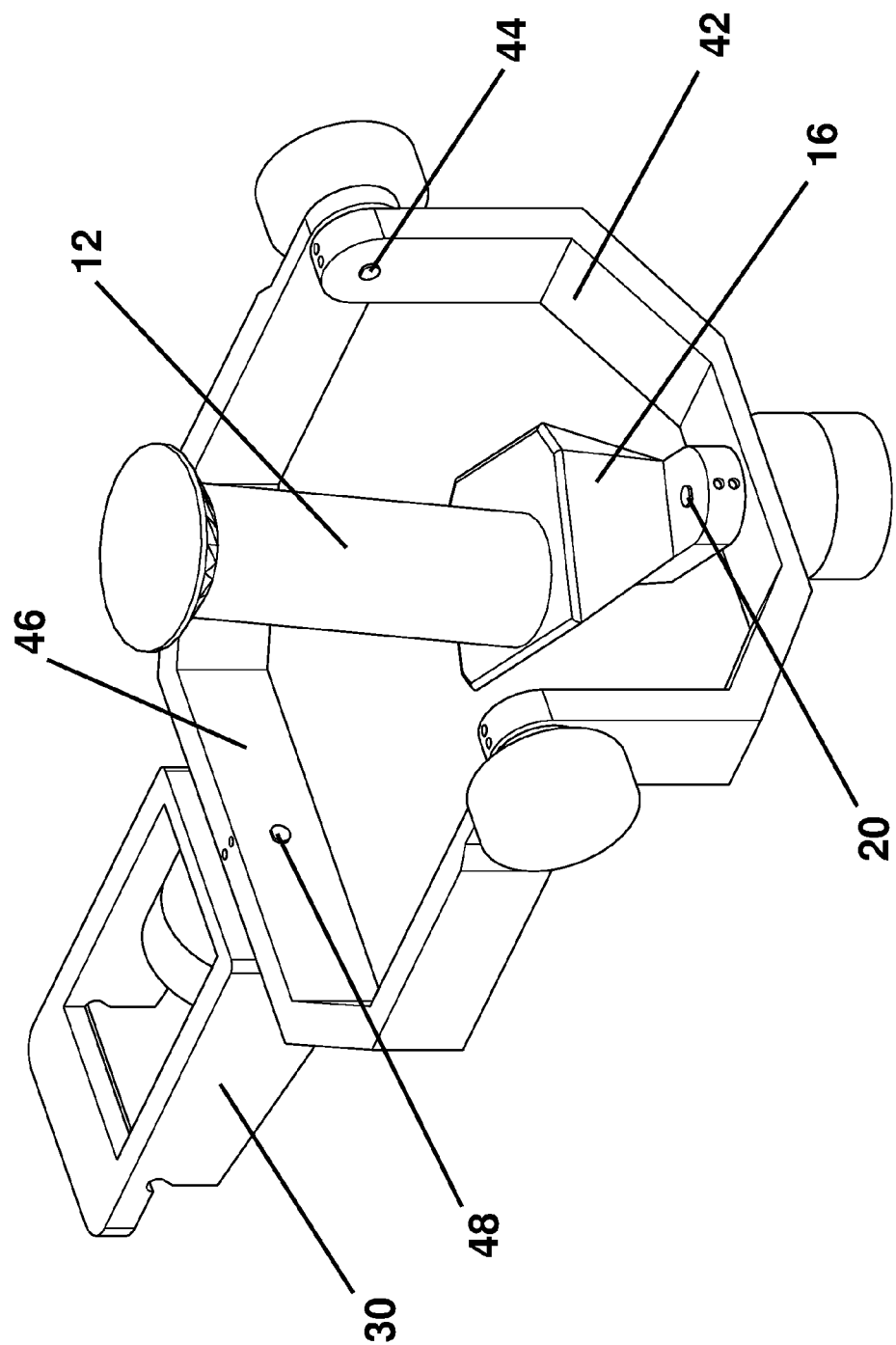
FIG. 15 shows the controller of FIG. 10 rotated around the yaw axis.

FIG. 15 shows the controller of FIG. 10 with rotation around the yaw axis. This is analogous to what is shown in FIG. 6.

Figure 16:
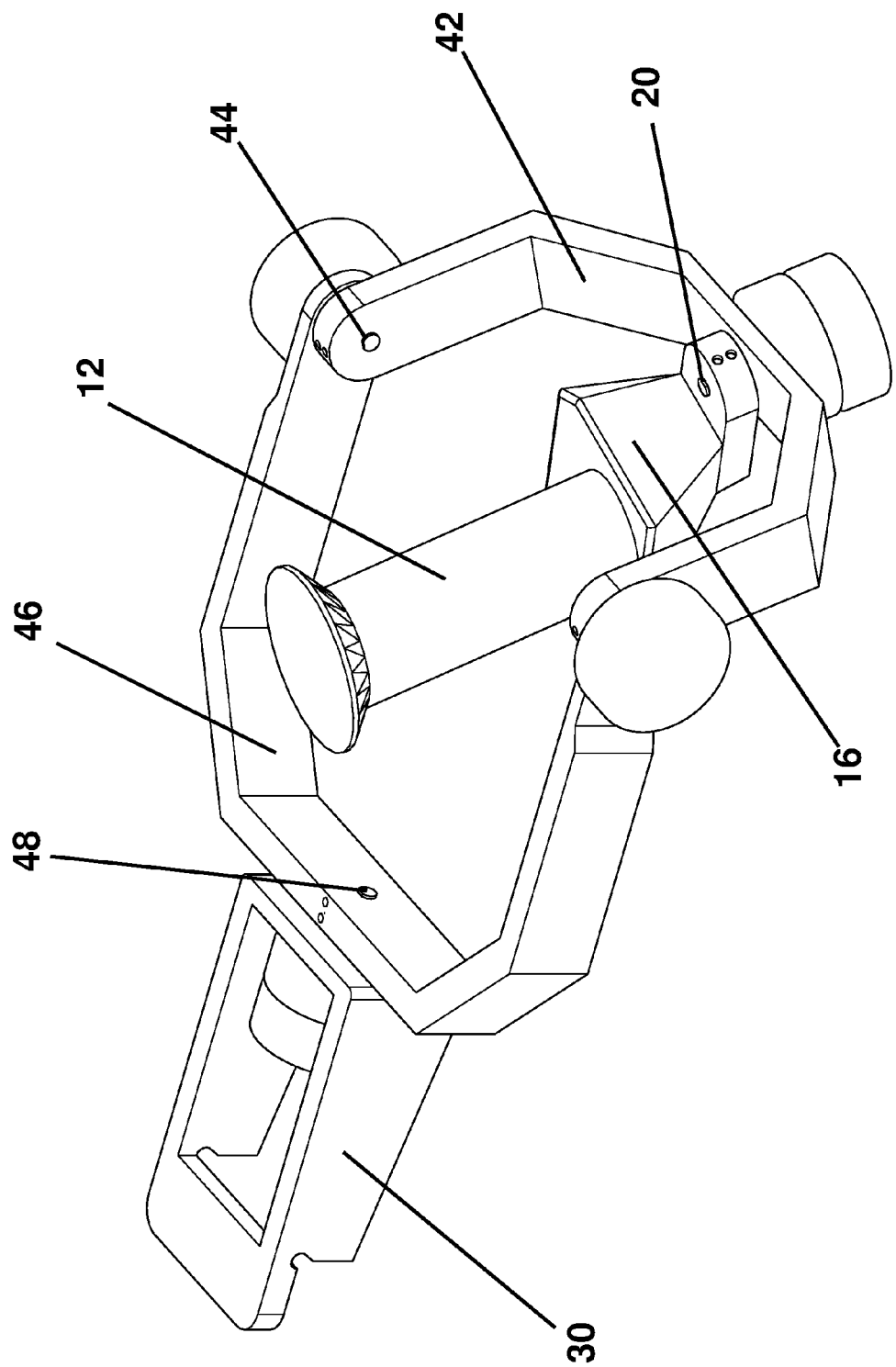
FIG. 16 shows the controller of FIG. 10 rotated around the yaw and pitch axes.

FIG. 16 shows the controller of FIG. 10 with rotations around the yaw and pitch axes. This is analogous to what is shown in FIG. 7.

Figure 17:
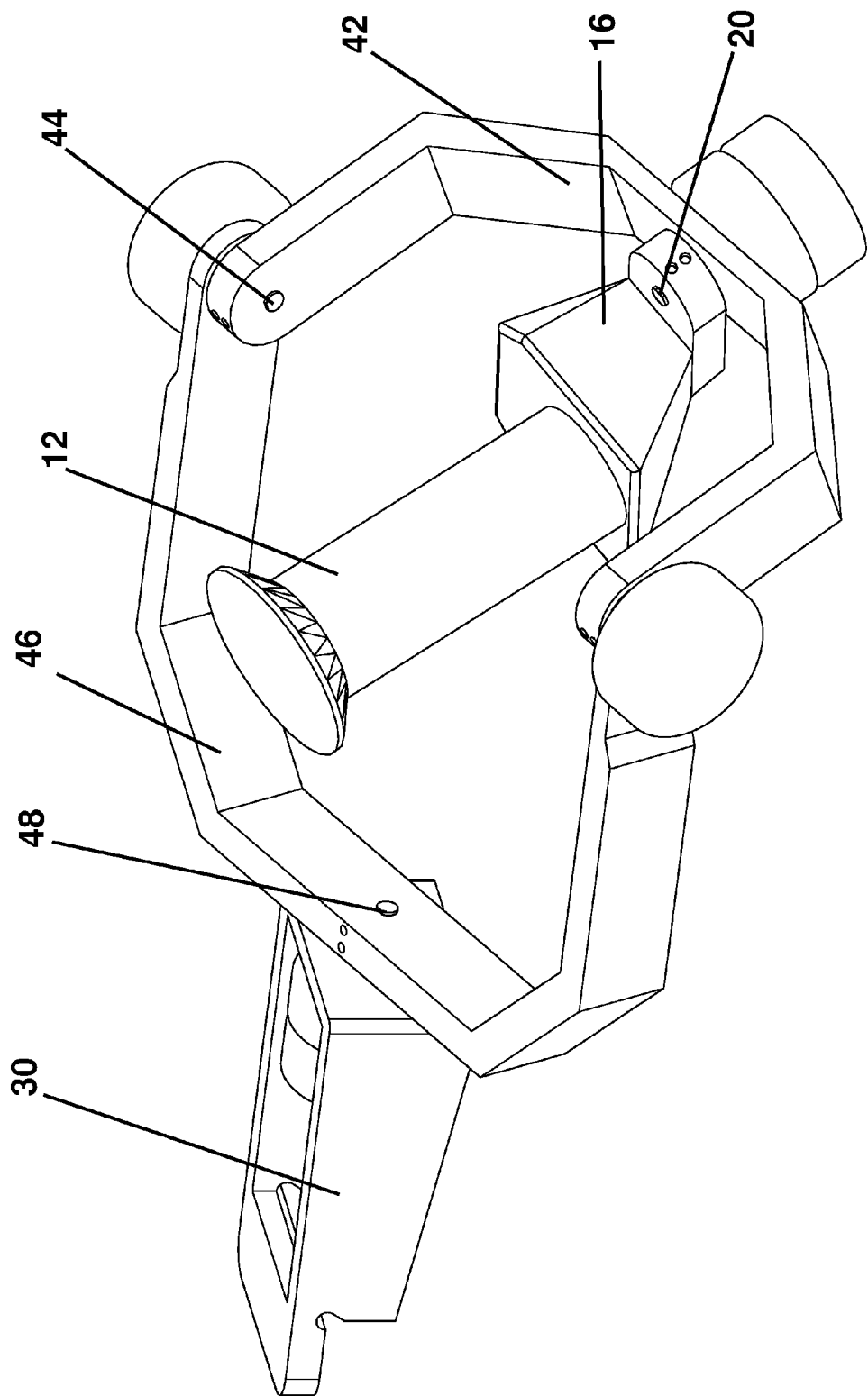
FIG. 17 shows the controller of FIG. 10 rotated around the yaw, pitch, and roll axes.

FIG. 17 shows the controller of FIG. 10 with rotations around the yaw, pitch, and roll axes. This is analogous to what is shown in FIG. 8.

Figure 18:
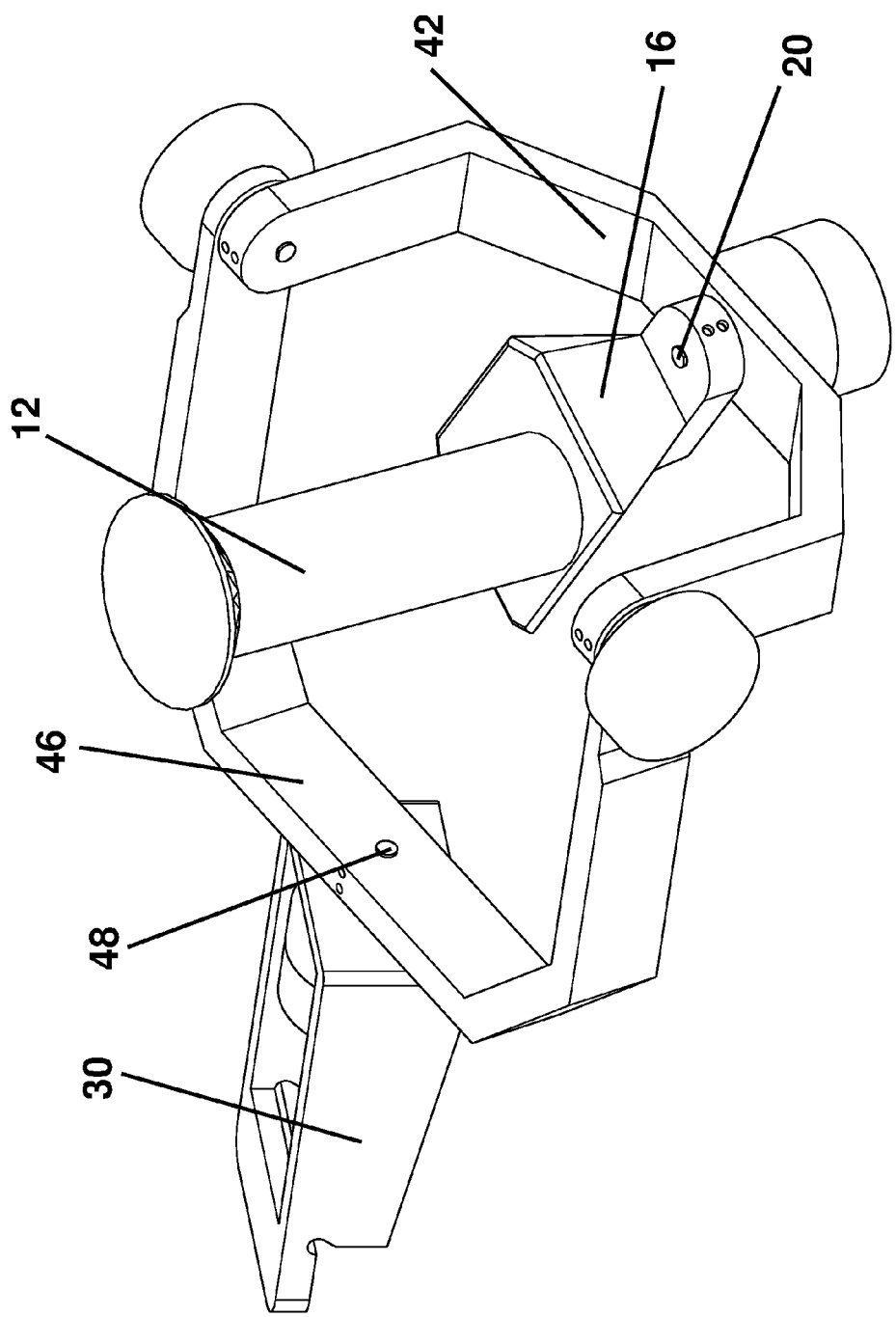
FIG. 18 shows the controller of FIG. 10 rotated around the yaw and roll axes.

FIG. 18 shows the controller of FIG. 10 with rotations around the yaw and roll axes. This is analogous to what is shown in FIG. 9.

Referring now especially to FIGS. 10-18, the dual connection points between the first and second flanges add rigidity as well as bump resistance. A "bump" is an unwanted movement of the flanges and/or joystick with respect to one another. Each flange and the fixed position mounting base has two torque motors 40 for redundancy and protection against electrical failure. In some embodiments, the rotation of the R link is used at lower speeds for coarse steering maneuvers, such as turning and parking, rotation of the Y link is used for fine steering adjustment for higher speed maneuvers, such as highway lane keeping or lane changes, or rotation of both can occur simultaneously.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described herein-above are also contemplated and within the scope of the disclosed technology.

I claim:

1. A controller, comprising:
    a fixed position mounting base;
    a first flange having a first end and second end at right angles to each other, said first end of said first flange rotatably connected to said fixed position mounting base;
    a second flange having a first end and second end at right angles to each other, said first end of said second flange rotatably connected to said second end of said first flange;
    a joystick rotatably connected to said second end of said second flange;
    wherein rotation of said first flange with respect to said fixed position mounting base causes a vehicle to turn left or right and rotation of said second flange with respect to said first flange causes said vehicle to accelerate or decelerate.

2. The controller of claim 1, wherein a roll sensor measures rotation of said first flange with respect to said fixed position mounting base.

3. The controller of claim 2, wherein a pitch sensor measures rotation of said second flange with respect to said first flange.

4. The controller of claim 3, wherein a yaw sensor measures rotation of said joystick with respect to said second flange.

5. The controller of claim 4, wherein a most elongated axis of said joystick is substantially perpendicular to a linkage which rotatably attaches said fixed position mounting base to said first flange, and said second end of said first flange and said first end of said second flange are at right angles to each other.

6. The controller of claim 1, wherein rotation of said joystick with respect to said second flange causes said vehicle to turn left or right to a lesser degree per degree of rotation than said rotation of said first flange with respect to said fixed position mounting base.

7. A controller, comprising:
    a fixed position mounting base;
    a substantially U-shaped first flange having a mid-region and first and second ends, a middle of said mid-region rotatably connected to said fixed position mounting base;
    a substantially U-shaped second flange having a mid-region and first and second ends, said first ends of said first and second flanges being rotatably connected, and said second ends of said first and second flanges being rotatably connected;
    a joystick rotatably connected to a middle of said mid-region of said second flange; wherein
    rotation of said second flange with respect to said first flange causes said vehicle to accelerate or decelerate and rotation of said joystick with respect to said second flange causes said vehicle to turn left or right to a lesser degree per degree of rotation than said rotation of said first flange with respect to said fixed position mounting base.

8. The controller of claim 7, further comprising at least one torque motor engaged with a linkage between said first flange and said second flange providing counteractive force to movement of said second flange with respect to said first flange.

9. The controller of claim 8, wherein said counteractive force is zero when said second flange is at right angle to said first flange, and said counteractive force increases as said second flange moves away from said right angle to said first flange.

10. The controller of claim 7, wherein a roll sensor measures rotation of said first flange with respect to said fixed position mounting base.

11. The controller of claim 10, wherein a pitch sensor measures rotation of said second flange with respect to said first flange.

12. The controller of claim 11, wherein a yaw sensor measures rotation of said joystick with respect to said second flange.

13. The controller of claim 7, wherein a most elongated axis of said joystick is substantially perpendicular to each of:
    said mid-region of said first flange;
    said mid-region of said second flange;
    said first ends of said first flange;
    said first ends of said second flange;
    said second ends of said first flange; and
    said second ends of said second flange.

14. The controller of claim 7, wherein rotation of said first flange with respect to said fixed position mounting base causes a vehicle to turn left or right.

* * * * *